(12) United States Patent
Cross et al.

(10) Patent No.: US 8,127,133 B2
(45) Date of Patent: Feb. 28, 2012

(54) LABELING OF DATA OBJECTS TO APPLY AND ENFORCE POLICIES

(75) Inventors: David B. Cross, Redmond, WA (US); Satyajit Nath, Redmond, WA (US); George Z. Li, Redmond, WA (US); Tanmoy Dutta, Redmond, WA (US); Sunil Gottumukkala, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1012 days.

(21) Appl. No.: 11/627,059

(22) Filed: Jan. 25, 2007

(65) Prior Publication Data

US 2008/0184329 A1 Jul. 31, 2008

(51) Int. Cl.
*H04L 29/06* (2006.01)
(52) U.S. Cl. .............................. 713/167; 726/1; 709/201
(58) Field of Classification Search ...... 726/1; 709/201; 713/167
See application file for complete search history.

(56) References Cited

U.S. PATENT DOCUMENTS 4,218,582 A 8/1980 Hellman et al.
(Continued)

OTHER PUBLICATIONS

Byun, J-I. et al., "Purpose Based Access Control for Privacy Protection in Relational Database Systems", Cerias Tech Report 2004-52, http://www.cerias.purdue.edu/tools_and_resources/bibtex_archive/archive/2004-52.pdf, 13 pages.

(Continued)

*Primary Examiner* — Taghi Arani
*Assistant Examiner* — Angela Holmes
(74) *Attorney, Agent, or Firm* — Woodcock Washburn LLP

(57) ABSTRACT

One or more labels are associated with a data object. One or more policies are associated with each of the labels. Based on the labels associated with the data objects, the associated policies are dispatched to policy decision engines to take one or more actions to enforce the policy. The labels, and the policies associated with the labels, are chosen by a business administrator within an enterprise, and are implemented by an Information Technology (IT) administrator. The association between labels and polices allows the policy to be applied to an object to be decoupled from the characterization of the nature of the object, or its purpose and/or role within an enterprise, business purpose and/or context of the object. Examples of policies are: access, backup, retention, isolation, audit, etc.

21 Claims, 7 Drawing Sheets

U.S. PATENT DOCUMENTS

| | | | |
|---|---|---|---|
| 4,405,829 A | 9/1983 | Rivest et al. | |
| 4,424,414 A | 1/1984 | Hellman et al. | |
| 4,713,753 A | 12/1987 | Boebert et al. | |
| 4,864,616 A | 9/1989 | Pond et al. | |
| 4,926,476 A | 5/1990 | Covey | 380/4 |
| 4,955,082 A | 9/1990 | Hattori et al. | |
| 4,962,533 A | 10/1990 | Krueger et al. | |
| 4,984,272 A | 1/1991 | McIlroy et al. | |
| 5,052,040 A | 9/1991 | Preston et al. | |
| 5,204,961 A | 4/1993 | Barlow | 395/725 |
| 5,369,702 A | 11/1994 | Shanton | |
| 5,369,707 A | 11/1994 | Follendore, III | |
| 5,680,452 A | 10/1997 | Shanton | |
| 5,717,755 A | 2/1998 | Shanton | |
| 5,898,781 A | 4/1999 | Shanton | |
| 5,991,877 A | 11/1999 | Luckenbaugh | 713/200 |
| 6,931,411 B1 | 8/2005 | Babiskin et al. | 707/100 |
| 6,950,824 B1 | 9/2005 | Babiskin et al. | 707/100 |
| 7,082,102 B1 * | 7/2006 | Wright | 370/229 |
| 7,103,914 B2 | 9/2006 | Focke et al. | 726/22 |
| 2004/0015701 A1 | 1/2004 | Flyntz | 713/182 |
| 2004/0044655 A1 * | 3/2004 | Cotner et al. | 707/3 |
| 2005/0138110 A1 | 6/2005 | Redlich et al. | 709/201 |
| 2005/0289342 A1 | 12/2005 | Needham et al. | 713/169 |
| 2006/0021001 A1 | 1/2006 | Giles et al. | 726/1 |
| 2006/0206485 A1 | 9/2006 | Rubin et al. | 707/9 |
| 2006/0248585 A1 | 11/2006 | Ward et al. | 726/20 |

OTHER PUBLICATIONS

Hinke, T.H., "Multilevel Secure Database Management Prototypes", http://www.acsa-admin.org/secshelf/book001/23.pdf, Essay 23, Information Security, 542-570.

Lee, T.M.P., "Using Mandatory Integrity to Enforce "Commercial" Security", *IEEE*, 1988, http://ieeexplore.ieee.org, 140-146.

Massey, "An Introduction to Contemporary Cryptology," Proceeding of the IEEE, May 1988, pp. 533-549.

Schneier, "Untangling Public-Key Cryptography," Dr. Dobb's Journal, May 1992, pp. 16-28.

* cited by examiner

LABELING OF DATA OBJECTS TO APPLY AND ENFORCE POLICIES

BACKGROUND

It is desirable to apply and enforce policies on the management and use of electronic data. Policies can be used to support such goals as access control, compliance of financial reporting, data privacy, protection of intellectual property or sensitive data, protection from malware, etc.

Presently, systems and applications require very complex and costly data analysis and controls that are custom developed to a specific business process, law, regulation or requirement. Each application requires its own mechanism to control and protect data which is difficult if not impossible to apply to a second set of data or process.

Moreover, the mechanism for specifying the rules governing a particular data object is generally to associate the policy itself with the data object. This direct association between the policy and the data object makes it difficult to change the policy that governs a large class of similar objects (e.g., to change the policy governing all health records), since the policy would have to be changed for each object. It would be advantageous to have a level of abstraction that allows policies to be defined separately from the classification of data objects. (E.g., to define that a data object is a "health record," and to separately define and/or change the policy that applies to health records.)

SUMMARY

A mechanism is provided to label data objects, and to associate policies with the labels, thereby providing a flexible mechanism to associate a heterogeneous set of policies with a number of data objects. Data objects can be any type of data, such as files, e-mails, software, etc. A database stores a set of labels, a set of policies, and a set of associations between the labels and the policies. Each data object is associated with one or more labels. The policies to be applied to a data object are selected based on the particular data label(s) associated with that data object. On performing the operations on the data objects, the policies relevant to the operations are dispatched to one or more policy engines. The policy engines may produce results—e.g., if the policy is an access policy based on conditions such as userid, date, and time, then the policy engine may return a result indicating whether the conditions for access have been met. Based on these results, access may be granted or denied, or other actions may be taken. The mechanism may be a component within an operating system that exposes an Application Programming Interface (API), so that the mechanism may be used by software (both applications and system software) that runs within the environment provided by that operating system.

Data labels may be prepackaged (e.g., provided with the labeling and enforcement mechanism), or may be custom-defined. Custom-defined labels are typically defined by a business person within an organization, who defines the labels based on the types of data handled by that organization. The business person communicates the labels, and the policies to be associated with those labels, to an Information Technology (IT) administrator, who creates the programming for the policies and associates the appropriate policies with the labels. The IT administrator may also specify which users may use which labels to associate with data objects. (E.g., users who work in the finance department may have access to a different set of labels from users who work in the health department.) The policy associated with a particular label may be changed, thereby allowing an updated policy to be applied to existing data, without changing the label.

Other features are described below.

DETAILED DESCRIPTION

Overview

The subject matter described herein provides a system to apply policies to data objects based on labels associated with those objects. Examples of policies that can be applied are access policies (e.g., who may use a file, and whether it can be read or written), backup policies (files are to be backed up every 30 days), retention policies (files are to be retained for 30 days and then deleted), isolation policies (co-mingling of data, e.g., cut-and-paste of content, is allowed only among files with the same label), and others.

Some existing systems allow policies to be applied to data. An example of such a system is a Digital Rights Management (DRM) system, which allows a content publisher to specify access rules, and other rules, for content. The rules in such a system are generally specified on per content item—i.e., each content item has a license that specifies who can access the item, when it can be accessed, how many times, etc. Thus, if the rules for a content item, or class of content items, changes, each license would need to be rewritten. It is desirable to decouple the rules or policies themselves from the classification of data. For example, data of a given type could be labeled, where the label essentially points to a policy. The policy can be defined separately from the label, and can also be changed.

Additionally, it is desirable to provide a general mechanism that can be applied to data objects of various types—e.g., files, E-mail, data blobs, software, songs, etc. The mechanism can be provided as part of a general computing or operating environment—e.g., through the operating system. The mechanism can expose an Application Programming Interface (API) that allows applications and system software to use the mechanism to label data and to apply and enforce policies associated with the labels. Thus, a file system can use the API to apply and enforce labels on files, while an E-mail program can use the same API to apply and enforce labels on individual E-mail messages.

Labels and policies can be specified in any convenient and appropriate language (e.g., eXtensible Markup Language ("XML")). The labels, policies, and associations between the labels and policies can be stored in a database (which may be stored in a "metadata and policy" server that exists to store such labels and policies). Data objects may be associated with a particular label, and the association may be stored in various manners—e.g., the labels may be a header for the data object, or the data object and label may be placed together in a container, or a database that is separate from the data objects themselves may store the associations between labels and data objects.

Further Description

Figure 1:
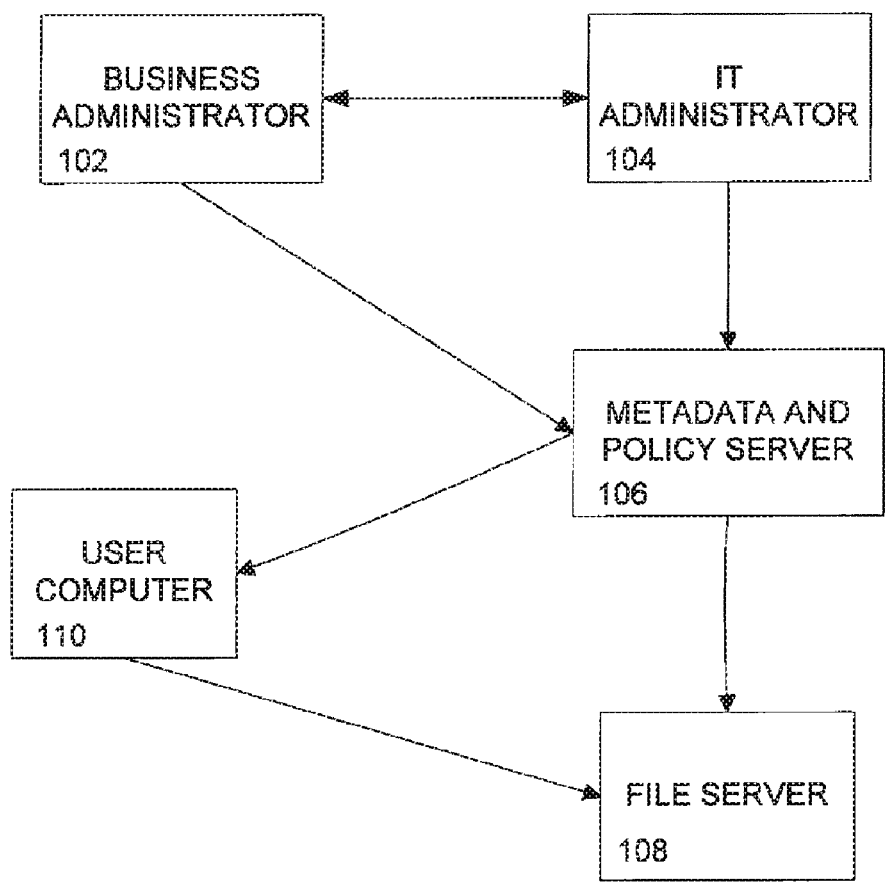
FIG. 1 is a block diagram of a scenario in which aspects of the subject matter described herein can be practiced.

FIG. 1 illustrates an environment 100 for practicing various examples of the subject matter described herein. Environment 100 includes a business administrator 102, an Information Technology (IT) administrator 104, a metadata and policy server 106, a file server 108, and a user computer 110.

Business administrator 102 identifies the data management requirements of various data objects, such as files, e-mail messages, directory objects, database elements, etc. Business administrator 102 defines a set of labels that can be applied to the data objects. The labels may be defined, for example, on the basis of the type of data object, the type of content the data object contains, or how the data object is expected to be used. Examples of labels include "none/null", "operating system", "untrusted", "low", "known malware", "possible spyware", "reported trojan software", "contains patient records", "classified", etc. For example, IT administrator 104 may define a label 'untrusted' for data objects that should not be saved on the computer and should be deleted immediately. The labels may be pre-defined (e.g., provided out-of-the-box) or custom-defined by business administrator 102. Business administrator 102 stores the labels in metadata and policy server 106. The labels may be stored in various ways, such as enveloped, detached, or in a centralized server based on type, etc. Furthermore, the labels may be defined in various formats such as binary, eXtensible Markup Language (XML), binary hexadecimal, etc.

IT administrator 104 consults with business administrator 102, to determine the business objectives for data management to be modeled by the labels and the policies that should be associated with each label. IT administrator 104 defines the meaning or objective of the labels that are identified by business administrator 102. Furthermore, IT administrator 104, in consultation with business administrator 102, defines and associates a set of policies with each of the labels. Examples of types of policies include, but are not limited to, authorization policy, access policy, isolation policy, audit policy, role policy, integrity policy, backup policy, retention policy, and so forth. Each of these policies represents different form of data management. The policies may be expressed in any type of language, of which XML is one example. More detailed examples of such policies include:

An access policy, which indicates whether the data object can be read, modified, copied, pasted, and so forth. For example, the access policy may be defined such that a user can modify a data object but cannot copy it to another location.

An isolation policy, which may be defined to limit commingling of data among objects that have different labels. For example, such a policy may say that it is possible to cut and paste data between files that have the a particular label in common, but that cut and paste cannot be performed between files that do not have that label in common.

An audit policy, which specifies that information is to be collected about all the users who accessed the data object, the operations performed on the data object, the changes made to the data object, and so forth. For example, an audit policy can collect information that user 'A' accessed a text file 'Y' and deleted two pages of the file and inserted an image in the text file.

A role policy, which specifies the roles that various users have with respect to a data object. For example, a role policy may specify that user 'A' can access a text file 'Y' but can not reset the access rights of the file, which is the role of the owner of the text file.

An integrity policy, which defines some action to be taken based on whether the data object appears to have been modified from some reference version of the object (e.g., by checking a hash of the object against a stored hash). For example, such a policy may require that, if the data object does not match a stored hash, then a user of the data object is not provided read access to the data object.

A backup policy, which defines how often a data object is to be copied to backup media, such as memory or hard disk, or other storage devices. For example, files that are related to an ongoing project could be labeled as such, and then the backup policy associated with that label could call for the files to be backed up every day.

A retention policy, which defines how long a data object is to be retained. For example, an e-mail message may be retained for one month from the day of receipt. Therefore, application of the retention policy may cause the e-mail message to be deleted after one month.

When the policies have been defined, IT administrator 104 associates one or more policies with each of the labels and stores this association in metadata and policy server 106. IT administrator 104 publishes the labels stored in metadata and policy server 106 to user computer 110. (It should be noted that the labels need not be stored in a central server such as metadata and policy server 106; alternatively, the labels could be stored in a local repository or database. It is also possible to distribute the storage of the labels to multiple servers or to multiple instances of user computers 110.) The central storage of labels referred to in FIG. 1 is merely a non-limiting example.) The actual labels that are published to user computer 110 may be a subset of the labels based on the nature of the particular user, as identified by business administrator 102. For example, a user computer in the finance department of a company may have access to a subset of labels defined for financial data objects, which a user computer in the health department may have access to labels defined for medical records.

A user can select one or more labels for a data object from the subset of labels available through user interfaces on user computer 110. The system can also implicitly label objects based on knowledge of the system (e.g., locations in certain system folders) without user intervention. A further variation is dynamic labels associated with data objects based on their context of use (e.g., a config file is labeled 'immutable' if it is opened by the application it is a config for, and not otherwise.) When a data object is to be labeled, a user selects one or more labels the data object from the subset of labels through user interfaces on user computer 110. The user assigns the label(s) to a data object on the basis of the type or content of the data object. For example, the user may assign label 'Finance' to a data object if that data object includes a tax return statement. Furthermore, the user may assign more than one label to a data object and define a relationship between these labels. The user assigns more than one label to the data object by explicitly assigning a first label to the data object. The data object then inherits an assignment of a second label on the basis of the relationship between these labels. Furthermore, the user may aggregate more than one data label or may provide a union of data labels to a data object to form aggregate labels for a data object. Moreover, the user may set precedence or give priority to the multiple labels assigned to a data object to resolve conflicts between policies associated through those labels. The user may also order the multiple labels assigned to a data object.

The labeled objects may be stored with fileserver 108. The labels may be stored together with their associated objects, or the associations between labels and objects may be stored separately from the objects themselves.

Based on the labels assigned to data objects by the user, an enforcement mechanism, which may be part of an operating system of user computer 110, retrieves the policies associated with the labels from metadata and policy server 106. Further, the enforcement mechanism enforces the policies upon the data objects.

Figure 2:
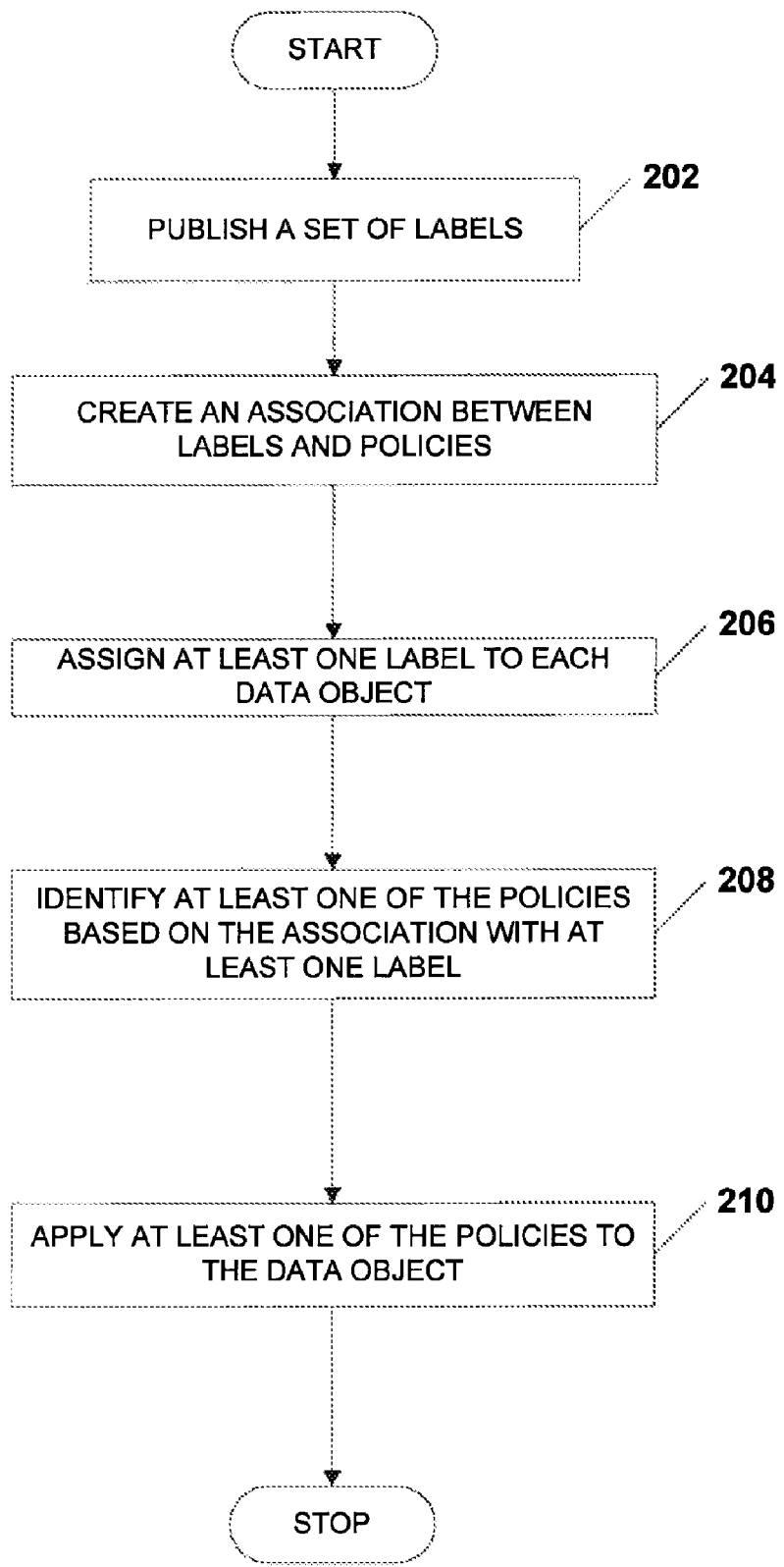
FIG. 2 is a flow diagram of a method of enforcing rules on the use of data objects.

FIG. 2 is a flow diagram, illustrating a method for enforcing rules on the use of data objects. At 202, a set of labels are published for association with data objects. The labels may be published by business administrator 102 and are made available to a group of users. Labels are defined on the basis of the type of data objects and the business requirements associated with the group of the users. The labels may be stored in metadata and policy server 106.

At 204, an association is created between the labels and policies. The association may be created by IT administrator 104 in consultation with business administrator 102. The association between the labels and the policies may be stored in metadata and policy server 106.

At 206, at least one label is assigned to each of the data objects. The labels are assigned by the user on the basis of the type or content of the data in data objects. At 208, one or more policies that are associated with each of the labels are identified. The one or more policies are identified by an enforcement mechanism, which may be present in the operating system of user computers 110. The enforcement mechanism identifies the one or more policies associated with each of the labels by looking up for the association between labels and policies 316 that are stored in metadata and policy server 106. At 210, the one or more policies associated with each of the labels are applied on the data objects. The one or more policies applied on a data object depend upon the one or more labels assigned to the data object by the user.

Figure 3:
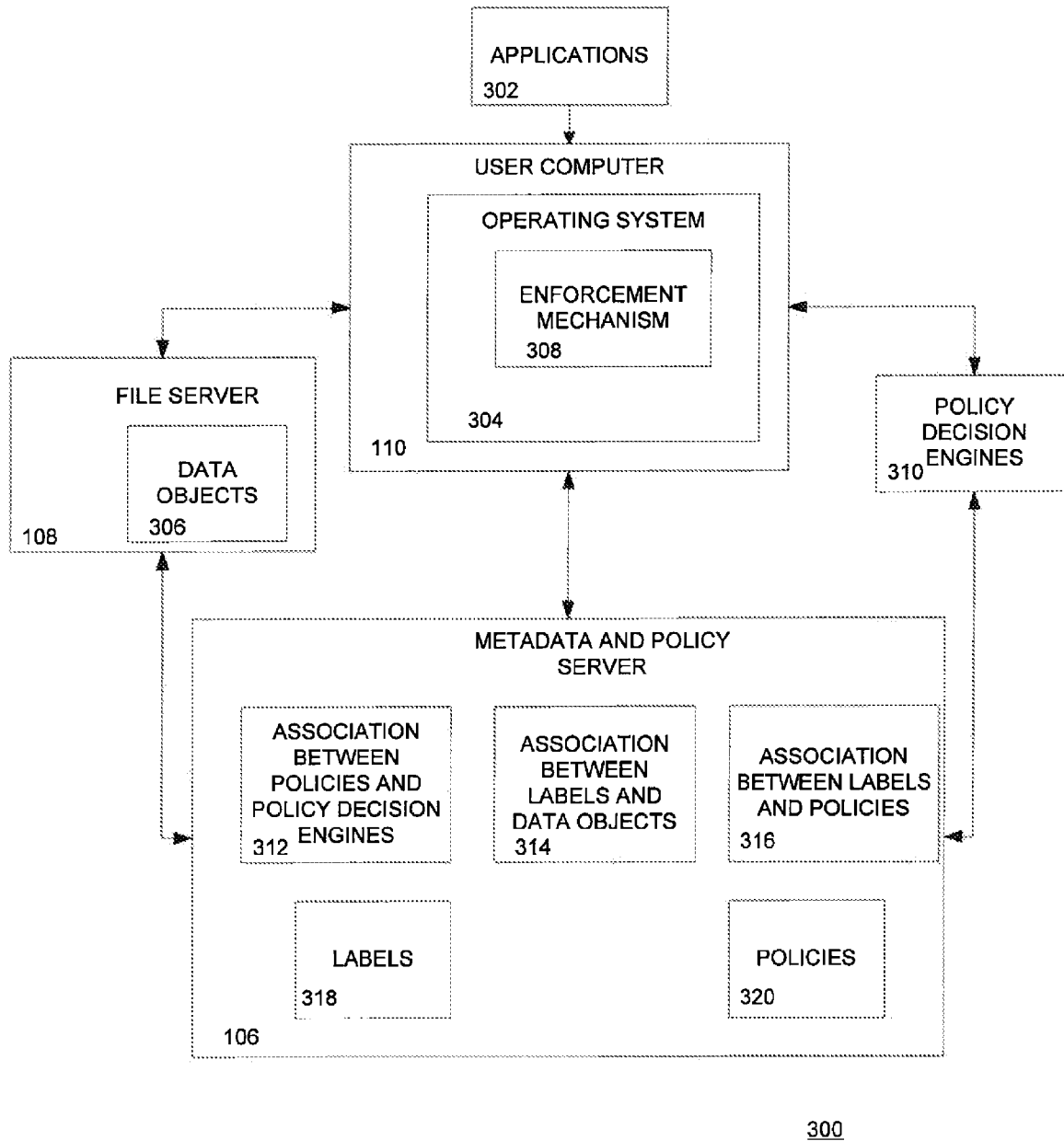
FIG. 3 is a block diagram of a system that performs an enforcement operation on an object.

FIG. 3 is a block diagram of a system 300 for performing an enforcement operation on an object. System 300 includes applications 302, user computer 110, policy decision engines 310, a file server 108, and a metadata and policy server 106. User computer 110 includes an operating system 304 and an enforcement mechanism 308. A user of user computer 110 can access various data objects 306 stored on file server 108. Each data objects 306 is associated with one or more labels. These labels 318 are stored on metadata and policy server 106. Metadata and policy server 106 further stores an association between policies and policy decision engines 312, an association between labels and data objects 314, an association between labels and policies 316, and a plurality of policies 320.

Applications 302 send requests for an operation on data object 306. Data objects 306 are stored on file server 108. The operation may be modifying data objects 306, backing up data objects 306, copying and pasting data between data objects 306, and so forth. The request is sent to enforcement mechanism 308 that is present in operating system 304 of user computer 110. Enforcement mechanism 308 may be an application on user computer 110, or, as another example, may be a hardware component. Enforcement mechanism 308 is called through an API. The API is called with the labels 318 associated with the requested data object 306. The labels are retrieved either from the resource manager that handles the data object or, in some cases, by looking them up in the metadata and policy server. Labels 318 associated with the requested data objects 306 are identified by referring to the association between labels and data objects 314.

Furthermore, the API retrieves policies 320 associated with the retrieved labels 318. Policies 320, associated with the retrieved labels 318, are identified on the basis of association between labels and policies 316. The retrieved policies 320 are then dispatched to their respective policy decision engines 310. For example, the authorization policies are dispatched to the authorization policy decision engine, the audit policies are dispatched to the audit enforcement engines, and so forth. Policy decision engine 310 for a retrieved policy 320 is identified on the basis of association between policies and enforcement engines 312.

Policy decision engines 310 perform one or more actions for enforcing the retrieved policies 320 on the requested data object 306. Enforcement mechanism 308 collects the results of enforcement of policies 320 from policy decision engines 310. The results include directives from policy decision engines 310 on whether the operation is allowed. If the result from any of policy decision engines 310 prevents the operation, then the operation requested by applications 302 is not allowed. Enforcement mechanism 308 returns the results to applications 302.

Association between labels and policies 316 may be changed independent of association between labels and data objects 314. Furthermore, no action is necessary on data objects 306 for the system to enforce a modified list of association between labels and policies 316 or a modified policy. Furthermore, IT administrator 104 may adjust policies dynamically with changes in business requirements with the passage of time.

It should be noted that the decision made by one policy engine can affect decisions made by another policy engine. For example, one policy decision engine may evaluate the decision to allow write access to an object, while a second policy decision engine may evaluate the backup status of an application. Continuing with this example, the policy on write access may state that write access is not allowed if the object has not been backed up in the last 30 days. In this example, the second policy decision engine's evaluation of the backup status may inform the first policy decision engine's decision as to whether write access is allowed. This scenario is simply one, non-limiting example of how the decision of one policy decision engine can affect the decision of another policy decision engine.

In addition, association between labels 318 and data objects 314 may be dynamic. For example, consider a user who has access to patient data at a hospital to process billing records. Whenever the user enters patient data on user computer 110, prior to storage in the database, metadata and policy server 106 applies the 'patient privacy' label to the patient data. This is achieved by assigning the 'patient privacy' label to the schema for patient medical records in the database. Moreover, for records and information that are stored on file server 108, operating system 304 is automatically instructed by application 302 to assign the same 'patient privacy' label 318 to all files saved by application 302. Operating system 304 may also be configured not to allow any data object 306 that has label 318 to be copied to alternative locations or applications 302. Therefore, when the user tries to copy data object 306 from the database to a USB memory stick, the user is denied the rights.

Figure 4:
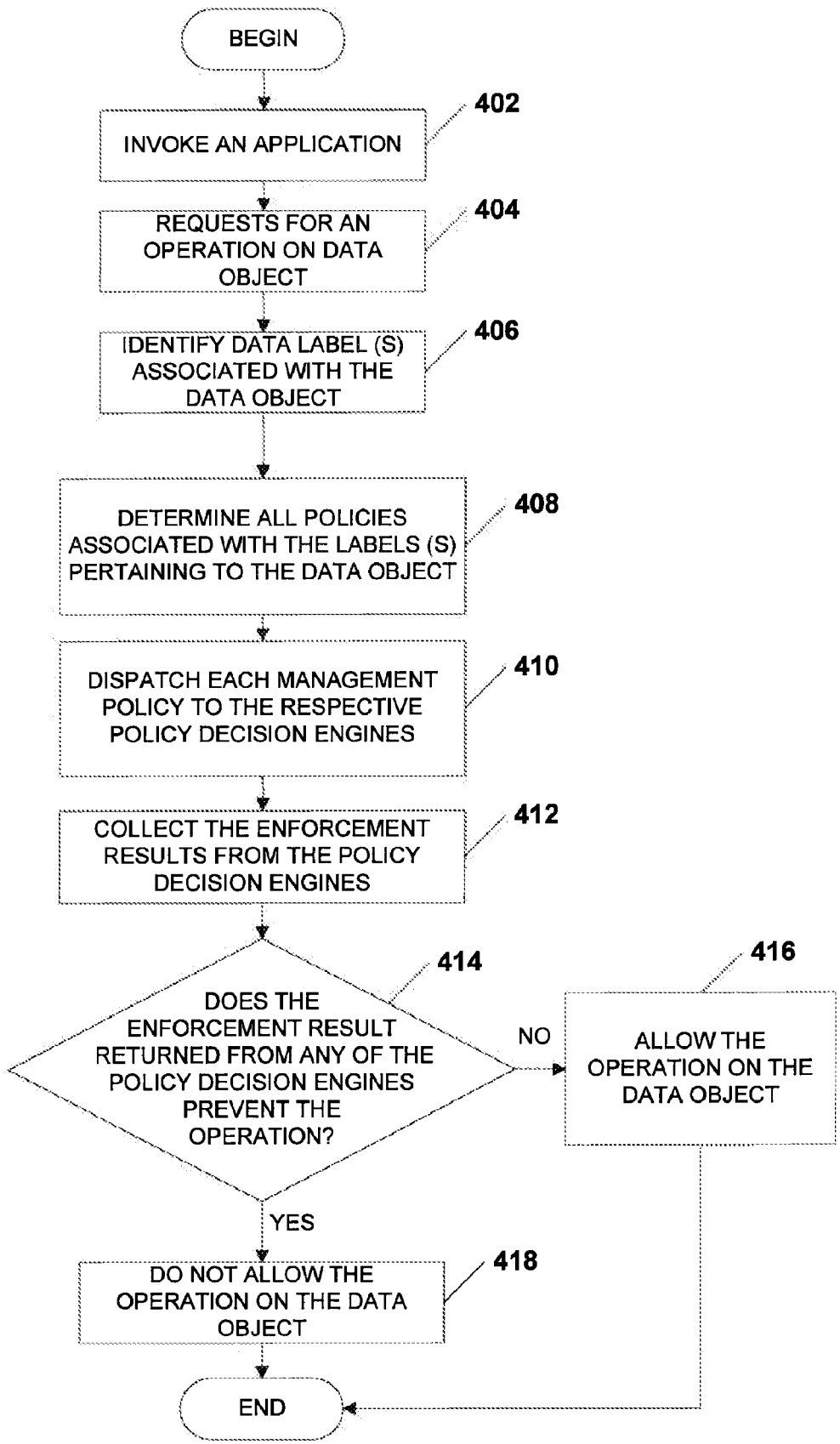
FIG. 4 is a flow diagram of a method of performing an enforcement operation on an object.

FIG. 4 is a flow diagram of a method for performing an enforcement operation on an object. At 402, application 302 is invoked by a user on user computer 110. At 404, an operation on data object 306 is requested by application 302. Data object 306 is stored on file server 108. The request from application 302 is received by enforcement mechanism 308 present in operating system 304 on user computer 110. At 406, label 318, associated with the requested data object 306, is identified. Enforcement mechanism 308 identifies label 318 associated with the requested data object 306 on the basis of association between labels 318 and data objects 314.

At 408, policies 320 associated with label 318 corresponding to data object 306, are determined. Policies 320 are determined by the enforcement mechanism 308 on the basis of association between labels and policies 316. At 410, each of policies 320 is dispatched to the respective policy decision engines 310. Policy decision engines 310 perform one or more actions for enforcing policies 320 on data object 306. At 412, the enforcement results are collected from policy decision engines 310. The enforcement results are the results of the one or more actions performed by policy decision engines 310 for enforcing policies 320 on data object 306. The enforcement results are collected by enforcement mechanism 308.

At 414, enforcement mechanism 308 checks the enforcement results collected from policy decision engines 310. If any of the enforcement results prevent the operation on data object 306, then, at 418, the operation is not allowed on data object 306. However, if none the enforcement results prevent the operation on data object 306 then, at 416, the operation on data object 306 is allowed.

Figure 5:
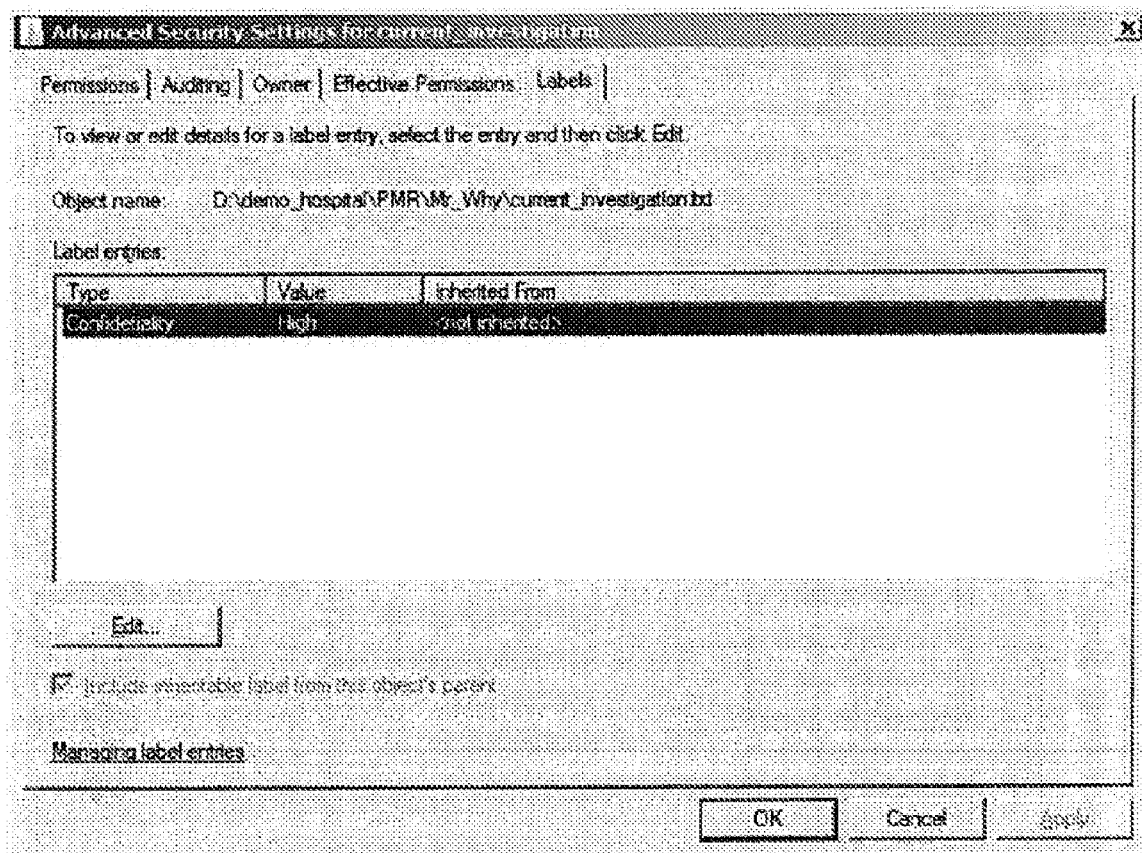
FIG. 5 is a block diagram of an example user interface for managing labels and policies corresponding to a data object.

FIG. 5 is a view of an example user interface 500 for managing labels 318 and policies 320 corresponding to a data object 306. User interface 500 may be used by a user on user computer 110 (shown in FIG. 1) to modify labels 318 and policies 320 corresponding to data objects 306. Furthermore, user interface 500 may be used by business administrator 102 and IT administrator 104 (shown in FIG. 1). User interface 500 may be used to view and edit the details for labels 318. The label entry includes details such as type of the label, value of the label, and the parent label. For example, user interface 500 includes the label entry for data object 'current_investigation.txt'. The 'object name' indicates the name of the data object, 'current_investigation.txt', for which labels are displayed. The type of label for 'current_investigation.txt' is 'Confidentiality', value of this label is 'High'. A user may edit the details for a label entry by using the 'Edit' button on user interface 500. A user may use the 'Permissions' tab on user interface 500 to set permissions for individual activities on 'current_investigation.txt' data object.

Figure 6:
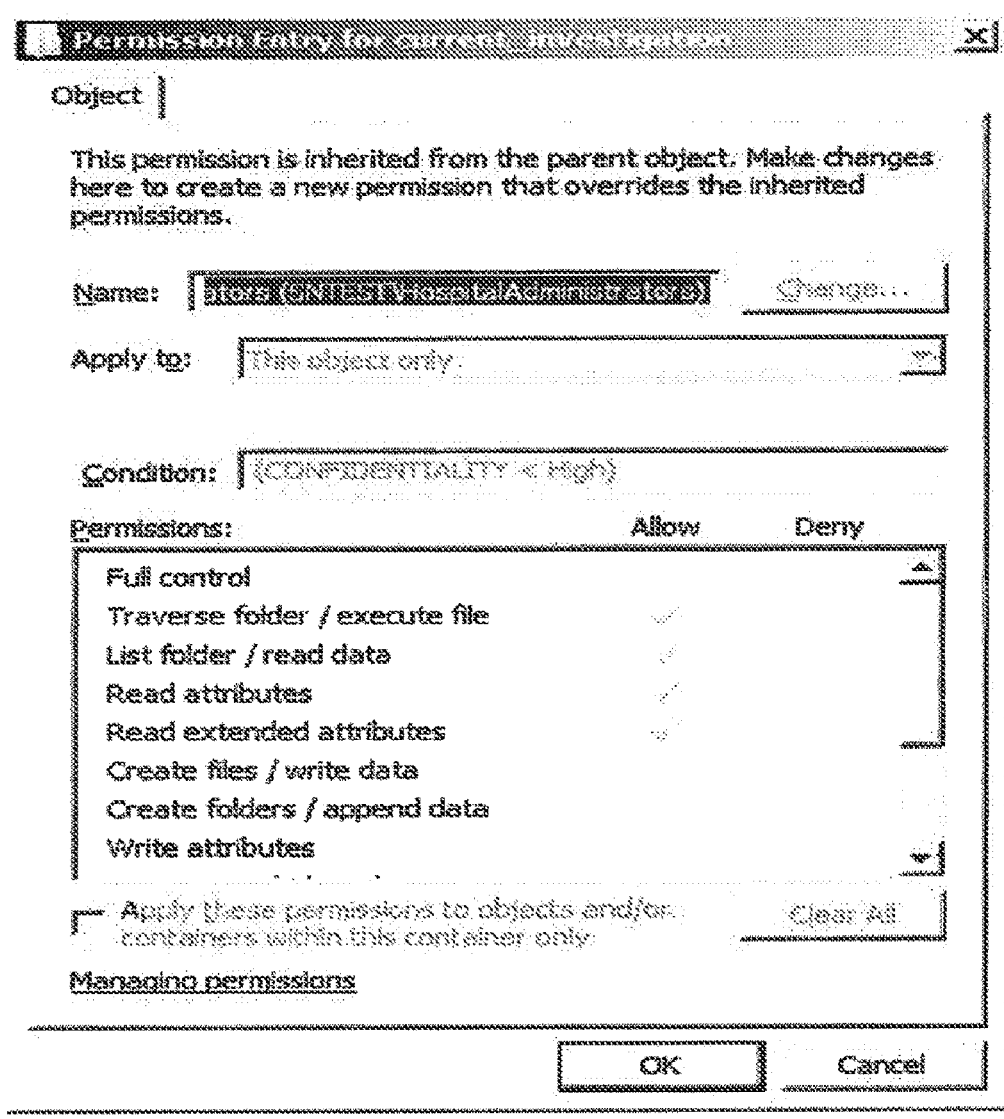
FIG. 6 is a block diagram of an example user interface for setting permissions for an object's label and policy.

FIG. 6 is a view of an example user interface 600 for setting permissions for label 318 and policy 320. Each data object 306 may inherit the permissions assigned to its parent data object. Furthermore, new or modified permissions can be assigned to data object 306 by a user, business administrator 102, or IT administrator 104. User interface 600 represents a list of the permissions for data object 306 that may be provided to the user on the basis of his/her role. Furthermore, user interface 600 represents a list of allowed permissions that data object 306 inherits from its parent data object. For example, as shown in user interface 600, the 'current_investigation.txt' data object inherits 'execute file', 'read data', 'read attribute', and 'read extended attributes' permissions from its parent data object. Further, the user can change the permissions and create new permissions that may override the inherited permissions. The user can change the permissions by using 'Change' button on user interface 600.

Example Computing Environment

Figure 7:
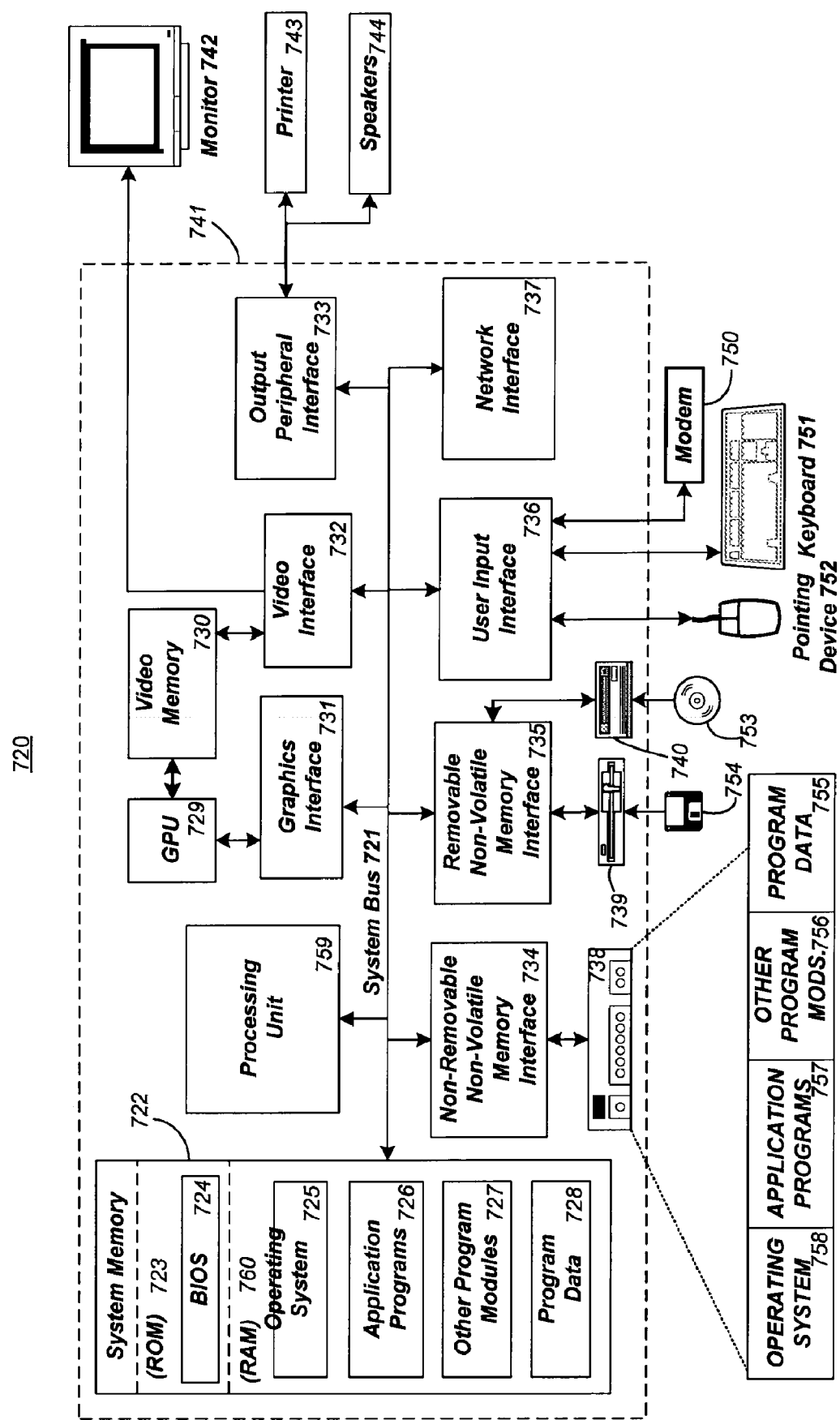
FIG. 7 is a block diagram of an example computing environment.

FIG. 7 is a block diagram of an example computing environment. The computing system environment 720 is only one example of a suitable computing environment and is not intended to suggest any limitation as to the scope of use or functionality of the subject matter disclosed herein. Neither should the computing environment 720 be interpreted as having any dependency or requirement relating to any one or combination of components illustrated in the example operating environment 720.

Aspects of the subject matter described herein are operational with numerous other general purpose or special purpose computing system environments or configurations. Examples of well known computing systems, environments, and/or configurations that may be suitable for use with the subject matter described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An example system for implementing aspects of the subject matter described herein includes a general purpose computing device in the form of a computer 741. Components of computer 741 may include, but are not limited to, a processing unit 759, a system memory 722, and a system bus 721 that couples various system components including the system memory to the processing unit 759. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 741 typically includes a variety of computer readable media. Computer readable media can be any available media that can be accessed by computer 741 and includes both volatile and nonvolatile media, removable and non-removable media. By way of example, and not limitation, computer readable media may include computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 741. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 722 includes computer storage media in the form of volatile and/or nonvolatile memory such as read only memory (ROM) 723 and random access memory (RAM) 760. A basic input/output system 724 (BIOS), containing the basic routines that help to transfer information between elements within computer 741, such as during startup, is typically stored in ROM 723. RAM 760 typically contains data and/or program modules that are immediately accessible to and/or presently being operated on by processing unit 759. By way of example, and not limitation, FIG. 7 illustrates operating system 725, application programs 726, other program modules 727, and program data 728.

The computer 741 may also include other removable/non-removable, volatile/nonvolatile computer storage media. By way of example only, FIG. 7 illustrates a hard disk drive 738 that reads from or writes to non-removable, nonvolatile magnetic media, a magnetic disk drive 739 that reads from or writes to a removable, nonvolatile magnetic disk 754, and an optical disk drive 740 that reads from or writes to a removable, nonvolatile optical disk 753 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 738 is typically connected to the system bus 721 through a non-removable memory interface such as interface 734, and magnetic disk drive 739 and optical disk drive 740 are typically connected to the system bus 721 by a removable memory interface, such as interface 735.

The drives and their associated computer storage media discussed above and illustrated in FIG. 7, provide storage of computer readable instructions, data structures, program modules and other data for the computer 741. In FIG. 7, for example, hard disk drive 738 is illustrated as storing operating system 758, application programs 757, other program modules 756, and program data 755. Note that these components can either be the same as or different from operating system 725, application programs 726, other program modules 727, and program data 728. Operating system 758, application programs 757, other program modules 756, and program data 755 are given different numbers here to illustrate that, at a minimum, they are different copies. A user may enter commands and information into the computer 741 through input devices such as a keyboard 751 and pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). A monitor 742 or other type of display device is also connected to the system bus 721 via an interface, such as a video interface 732. In addition to the monitor, computers may also include other peripheral output devices such as speakers 744 and printer 743, which may be connected through an output peripheral interface 733.

It should be understood that the various techniques described herein may be implemented in connection with hardware or software or, where appropriate, with a combination of both. Therefore, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although the explanations provided may refer to the use of subject matter described herein in the context of one or more stand-alone computer systems, the description is not so limited, but rather may be implemented in connection with any computing environment, such as a network or distributed computing environment. Aspects of the subject matter described herein may be implemented in or across a plurality of processing chips or devices, and data remembrance devices. For example, a data remembrance device, for example a memory or a storage device, includes a module that receives a request from a program to perform an operation on an object. Based on one or more labels associated with the object, the module determines which one or more policies are to be applied to the object. The module may identify one or more policy engines, from a plurality of policy engines that are to apply the one or more policies to the object. The module receives one or more results from the one or more policy engines. Based on results received from the one or more policy engines, the module determines whether the requested operation is permitted. The module executes in the operating system of a user computer.

Various examples of the subject matter described herein provide a method that provides an environment wide infrastructure for policy enforcement. The method is made environment-wide by building it into the operating system. For example, the enforcement mechanism may be built into the operating system, and exposed to applications via an API so that the applications can use the operating system mechanism to apply labels and policies to any type of data object.

CONCLUSION

While the examples provided herein have been illustrated and described, it will be clear that the claimed subject matter is not limited to these examples only. Numerous modifications, changes, variations, substitutions and equivalents will be apparent to those skilled in the art without departing from the spirit and scope of the claimed subject matter as described in the claims.

What is claimed:

1. One or more computer-readable storage media encoded with computer-executable instructions to perform a method of performing an enforcement operation on an object, wherein the one or more computer-readable storage media are not a signal, the method comprising:
  receiving, from a program, a request for an operation on an object, wherein said object is associated with at least one label, said at least one label associated with a plurality of policies, wherein each policy of said plurality of policies corresponds to a respective policy decision engine of a plurality of policy decision engines, each respective policy decision engine being configured to apply the corresponding policy to said object, based on said association between the object and the at least one label and said association between the at least one label and the plurality of policies, to determine a result as to whether the operation is allowed to proceed on the object;

in response to the request dispatching each policy of the plurality of policies associated with the at least one label to said respective policy decision engine where the policy decision engine takes one or more actions in enforcement of the corresponding policy;

collecting results from the policy decision engine of each policy of the plurality of policies associated with the at least one label, said results comprising information indicating whether said operation is allowed;

determining, based on said results, that said operation is allowed; and allowing said operation to proceed.

2. The one or more computer-readable storage media of claim 1, wherein said method is performed by an operating system, and wherein said program runs under said operating system.

3. The one or more computer-readable storage media of claim 1, wherein said method is performed by an application.

4. The one or more computer-readable storage media of claim 1, wherein said at least one label defines uses that are permissible to be performed for users, computers or applications who are assigned to a particular role, wherein the roles assigned to each user are changeable over time, and wherein said determining that said operation is allowed comprises determining that a user who is operating said program is currently assigned to said role.

5. The one or more computer-readable storage media of claim 1, wherein said plurality of policies comprises an audit policy, and wherein at least one of the policy decision engines creates a record of access to said object in compliance with said audit policy.

6. The one or more computer-readable storage media of claim 1, wherein a first one of said plurality of policies does not govern whether access to said object is allowed, and wherein the actions taken in enforcement of said first one of said plurality of policies do not contribute to the determination that said operation is allowed.

7. The one or more computer-readable storage media of claim 1, wherein said plurality of policies comprises an isolation policy indicating that data from said object is not to be commingled with data from objects that do not belong to a defined class of objects.

8. The one or more computer-readable storage media of claim 7, wherein said operation includes copying and pasting data between said object and another object, and wherein one of said policy decision engines produces a result indicating that said operation is allowed based on a finding that said object and said another object are associated with the same label.

9. A system for performing an enforcement operation on an object comprising:

one or more processors;

one or more data remembrance devices;

a module that is stored in at least one of said one or more data remembrance devices and executable on at least one of said one or more processors, that receives a request from a program to perform an operation on said object, wherein said object is associated with one or more labels, said one or more labels associated with a plurality of policies, wherein each policy of said plurality of policies corresponds to a respective policy engine of a plurality of policy engines, each respective policy decision engine being configured to apply the corresponding policy to said object, based on said association between the object and the one or more labels and said association between the one or more labels and the plurality of policies, to determine a result as to whether the operation is allowed to proceed on the object, that determines, in response to the request, which policies are to be applied to said object based on said one or more labels that are associated with said object, that identifies the respective policy engine that corresponds to each policy from the plurality of policy engines, for each policy of the plurality of policies that is associated with said one or more labels, that receives one or more results from each policy engine of the plurality of policy engines, that determines whether the requested operation is permitted based on said one or more results received from each policy engine and that either permits the program to perform the operation or disallows the program from performing the operation depending on the results; and said plurality of policy engines, which generate said results by comparing said policies, and which perform at least one action that is part of enforcement of at least one of said plurality of policies but that does not contribute to said results.

10. The system of claim 9, wherein said module is part of an operating system, and wherein said program runs under said operating system.

11. The system of claim 9, wherein said plurality of policies comprise an audit policy and wherein at least one of the policy engines creates a record of access to said object in accordance with said audit policy.

12. The system of claim 9, wherein said plurality of policies comprise a retention policy that indicates how long said object is to be retained, and wherein at least one of said plurality of policy engines either dispose of said object or retain said object in accordance with said retention policy.

13. The system of claim 9, wherein the determination of which policies of the plurality of policies are to be applied to said object based on said one or more labels is determined using at least one of the following paradigms:

aggregation of data labels;

union of data labels;

defined priority or precedence of certain labels; or ordering of data labels.

14. A method of enforcing rules on the use of data objects comprising:

publishing a set of labels;

creating a set of associations between a set of policies and said set of labels, such that each label in said set of labels has a plurality of policies associated therewith, and wherein each policy of said plurality of policies corresponds to a respective policy decision engine of a plurality of policy decision engines, each respective policy decision engine being configured to apply the corresponding policy to a data object, based on an association between the corresponding policy and a label in said set of labels and an association with a the label and the data object, to determine a result based on said policy;

assigning at least one of the labels to a data object;

identifying, via a processor, at least one policy of the plurality of policies based on the association between said at least one policy and said at least one label of the set of labels;

applying said at least one policy to said data object, wherein the application of said at least one policy includes collecting a result from the policy decision engine that corresponds to said at least one policy, and wherein the application of said at least one policy includes performing at least one action that does not contribute to a decision as to whether to allow or deny a request to perform an operation on the data object.

15. The method of claim 14, further comprising:
storing the set of associations between the policies and the labels in a server;
and wherein said identifying comprises:
looking up said set of associations in said server.

16. The method of claim 14, wherein said publishing comprises:
making said set of labels available to a user, group of users or associations of users based on additional metadata creating a logical association;
and wherein the method further comprises:
selecting said set of labels from among a plurality of labels based on business requirements associated with said group of users.

17. The method of claim 14, wherein said set of policies comprises an audit policy, and wherein the method further comprises:
creating a record of access to said data object in accordance with said audit policy.

18. The method of claim 14, wherein said set of policies comprises an isolation policy indicating that data from said data object is not to be commingled with data from objects that do not belong to a defined class of objects.

19. The method of claim 14, further comprising:
defining a relationship between said label and a second label in said set of labels;
and wherein said assigning said label to said data object comprises:
explicitly assigning said label to said data object; and
inheriting an assignment of said second label to said data object based on said relationship.

20. The method of claim 14, wherein a first one of the policies is applied by a first policy decision engine, wherein a second one of the policies is applied by a second policy decision engine, and wherein a decision made by the first policy decision engine is taken into account by, the second policy decision engine and affects a decision made by the second policy decision engine.

21. A system for enforcing policies on a data object comprising:
a business administrator that defines at least one label that is associated with said data object;
an IT administrator that defines a set of policies and associates a plurality of said policies with said at least one label, and wherein said IT administrator consults with said business administrator to determine the business objectives for said association of said policies with said at least one label;
a storage module that stores said association of said policies with said at least one label, and wherein said storage module stores an association of each policy of said plurality of policies with a corresponding policy decision engine of a plurality of policy decision engines, each respective policy decision engine being configured to apply the corresponding policy to said data object, based on said association between the data object and the at least one label and said association between the at least one label and the plurality of policies, to determine a result based on said policy;
a user interface that allows a user to associate said at least one label with said data object;
and
an enforcement mechanism that retrieves the plurality of policies associated with said at least one label from the storage module and enforces the policies upon said data object, wherein said enforcement of said policies includes collecting a result from said policy decision engine that corresponds to each policy of said plurality of policies.

* * * * *